US011862413B2

(12) United States Patent
Siegelin

(10) Patent No.: US 11,862,413 B2
(45) Date of Patent: Jan. 2, 2024

(54) SENSING DEVICE FOR SENSING THE POSITION OF A MOVABLE OBJECT

(71) Applicant: FRAMATOME GmbH, Erlangen (DE)

(72) Inventor: Steffen Siegelin, Sonnefeld (DE)

(73) Assignee: FRAMATOME GmbH, Erlangen (DE)

( * ) Notice: Subject to any disclaimer, the term of this patent is extended or adjusted under 35 U.S.C. 154(b) by 0 days.

(21) Appl. No.: 17/802,926

(22) PCT Filed: Mar. 3, 2021

(86) PCT No.: PCT/EP2021/055375
§ 371 (c)(1),
(2) Date: Aug. 26, 2022

(87) PCT Pub. No.: WO2021/175943
PCT Pub. Date: Sep. 10, 2021

(65) Prior Publication Data

US 2023/0091585 A1 Mar. 23, 2023

(30) Foreign Application Priority Data

Mar. 5, 2020 (DE) ......................... 102020105990.6

(51) Int. Cl.
*H01H 21/18* (2006.01)
*H01H 21/28* (2006.01)

(52) U.S. Cl.
CPC ....... *H01H 21/18* (2013.01); *H01H 2021/287* (2013.01)

(58) Field of Classification Search
CPC .. H01H 3/00; H01H 3/02; H01H 3/04; H01H 3/16; H01H 3/22; H01H 3/32; H01H 3/34;

(Continued)

(56) References Cited

U.S. PATENT DOCUMENTS 3,247,342 A 4/1966 Ott et al.
4,707,965 A * 11/1987 Becker .................. B65B 61/205 53/410

(Continued)

FOREIGN PATENT DOCUMENTS

DE 3729303 A1 3/1989
DE 19635159 A 3/1998

(Continued)

OTHER PUBLICATIONS

Corresponding Search Report and Written Opinion for PCT/EP2021/055375.

*Primary Examiner* — Anthony R Jimenez
(74) *Attorney, Agent, or Firm* — Davidson, Davidson & Kappel, LLC

(57) ABSTRACT

A detection device (18) for detecting the position of a moving object comprises a base (20); an arm (22) that is mounted rotatable to the base (20), wherein the arm (22) is rotatable around a first rotational axis (26) and has a free end (28) for contact with the moving object; and a sensor (24) that is configured to detect rotation of the arm (22) relative to the base (20), wherein the sensor (24) has a first part and a second part, wherein the first part moves with the arm (22), and the second part is attached to the base (20). The first part is a first component of a magnet (40) switch (42) pair, wherein the switch is an electrical switch (42) that is configured to be actuated by the magnetic field of the magnet (40), and the second part is another component of the magnet (40) switch (42) pair.

17 Claims, 5 Drawing Sheets

(58) Field of Classification Search
CPC .. H01H 3/40; H01H 2003/00; H01H 2003/02; H01H 2003/32; H01H 2009/00; H01H 2009/20; H01H 21/00; H01H 21/22; H01H 21/285; H01H 21/18; H01H 21/36; H01H 2021/00; H01H 2021/02; H01H 2021/28; H01H 2021/287
USPC ........................................................ 200/47
See application file for complete search history.

(56) References Cited

U.S. PATENT DOCUMENTS

| | | | |
|---|---|---|---|
| 5,714,028 | A | 2/1998 | Horai et al. |
| 2015/0251366 | A1 | 9/2015 | Voth et al. |
| 2017/0081624 | A1 | 3/2017 | Tsukada |

FOREIGN PATENT DOCUMENTS

| | | | |
|---|---|---|---|
| DE | 69605465 | T2 | 5/2000 |
| DE | 202006011039 | U1 | 12/2007 |
| DE | 102008058154 | A1 | 5/2010 |
| DE | 202010012232 | U1 | 12/2011 |
| DE | 102014103159 | A1 | 9/2015 |
| DE | 102015102238 | A1 | 8/2016 |
| EP | 0539005 | A1 | 4/1993 |
| EP | 0843329 | A2 | 5/1998 |
| EP | 2703131 | A2 | 3/2014 |
| JP | S505557 | Y1 | 2/1975 |
| JP | S55171938 | U | 12/1980 |

* cited by examiner

SENSING DEVICE FOR SENSING THE POSITION OF A MOVABLE OBJECT

The present disclosure relates to a detection device for detecting a position of a moving object and its use.

The present disclosure also relates to a facility for sterilization of at least one moving object through irradiation, wherein the facility has at least one conveyor system to transport at least one moving object and a detection device.

In particular, the present disclosure relates to a detection device that is arranged such that it withstands high radioactive radiation, in particular a high gamma dose and/or high temperatures.

BACKGROUND

DE 37 29 303 A1 disclosed a switching device with a spring-loaded lever arm. EP 0 843 329 A2 disclosed a position switch with a swing lever.

In facilities for sterilizing objects using irradiation, such as sterilization of medical devices or components, high temperatures and/or radiation doses are often the rule. The objects are transported into the facility by a conveyor. Reliable control of the facility requires detecting the position of the objects.

Typically, the objects' positions are captured by a detection device, which, depending on design, shows only low resistance to high temperatures or high radiation doses. For example, such detection devices often contain a large number of polymer elements that can be degraded by continuous radiation. Such detection devices also often contain electronic components that can also be degraded by continuous radiation. Therefore, it is often necessary to replace the conventional detection devices. This leads to increased maintenance effort and expense.

SUMMARY

Accordingly, it is an object of the present disclosure at least to decrease the aforementioned disadvantages or to eliminate them. In particular, it is a task of the present disclosure to provide a detection device that has high radiation resistance and/or high temperature resistance.

According to the present disclosure, this object is achieved through a detection device for detecting a position of a moving object, wherein the detection device includes:

- a base;
- an arm that is mounted rotatable to the base, wherein the arm is rotatable around a first axis of rotation and has a free end for contact with the moving object; and
- a sensor that is configured to detect rotation of the arm relative to the base, wherein the sensor has a first part and a second part, wherein the first part moves with the arm, and the second part is attached to the base.

The first part is the first component of a magnet-switch pair, wherein the switch is an electrical switch that is configured to be actuated by the magnet's magnetic field, and the second part is the other component of the magnet-switch pair, wherein the electrical switch is in an initial state in the initial rotational position of the arm, and wherein the electrical switch is in a second rotational position of the arm that is different from the first rotational position of the arm, which is in a second state.

The detection device according to the present disclosure has high resistance to radioactive radiation and high resistance to temperature. In particular, high radiation resistance and resistance to high temperatures is achieved through the sensor, which contains the magnet and electrical switch. The electrical switch is configured to be actuated by the magnet's magnetic field and reliable detection of the position of the moving object even under high radiation exposure or high temperature.

According to preferential embodiments, the detection device according to the present disclosure has one, several or all of the following characteristics, in all technically possible combinations:

The arm is mounted rotatable to the base by a shaft and at least one bearing, in particular two bearings, wherein each bearing is in particular a sliding bearing.

The arm, the shaft and the bearing are made of metal.

The first part of the sensor is attached to the shaft.

The detection device has at least one reset device, in particular a spring, that is arranged to move the arm from the second rotational position back to the first rotational position.

The arm comprises a first section at the free end of the arm that is mounted rotatable to the base, and a second section that extends outward from the first section, wherein in particular the second section is mounted rotatable to the first section, wherein in particular the second section is rotatable around a second rotational axis, which is orthogonal to the first rotational axis.

At the free end, the arm has a roller, wherein the roller is arranged to form a contact point for the moving object, wherein in particular a roller's rotational axis is parallel to the first rotational axis.

The detection device is configured to resist a gamma dose of 20 kGy/h.

The arm is mounted by at least one form-fitting component to the base.

The magnet comprises a permanent magnet, in particular, the magnet is a permanent magnet.

The electrical switch comprises a reed switch, in particular, the electrical switch is a reed switch.

The first and second parts of the sensor are located in a housing that it mounted on the base.

The present disclosure additionally relates to use of a detection device to detect the position of an object transported into a sterilization facility, wherein the detection device has the characteristics described above.

The present disclosure additionally relates to a facility for sterilization of at least one moving object through irradiation, wherein the device has at least one conveyor system to transport at least one moving object and a detection device as described above, wherein the detection device is configured to detect the position of the transported moving object.

BRIEF SUMMARY OF THE DRAWINGS

Preferential embodiments of the present disclosure will now be described in detail through drawings, wherein.

DETAILED DESCRIPTION

Figure 1:
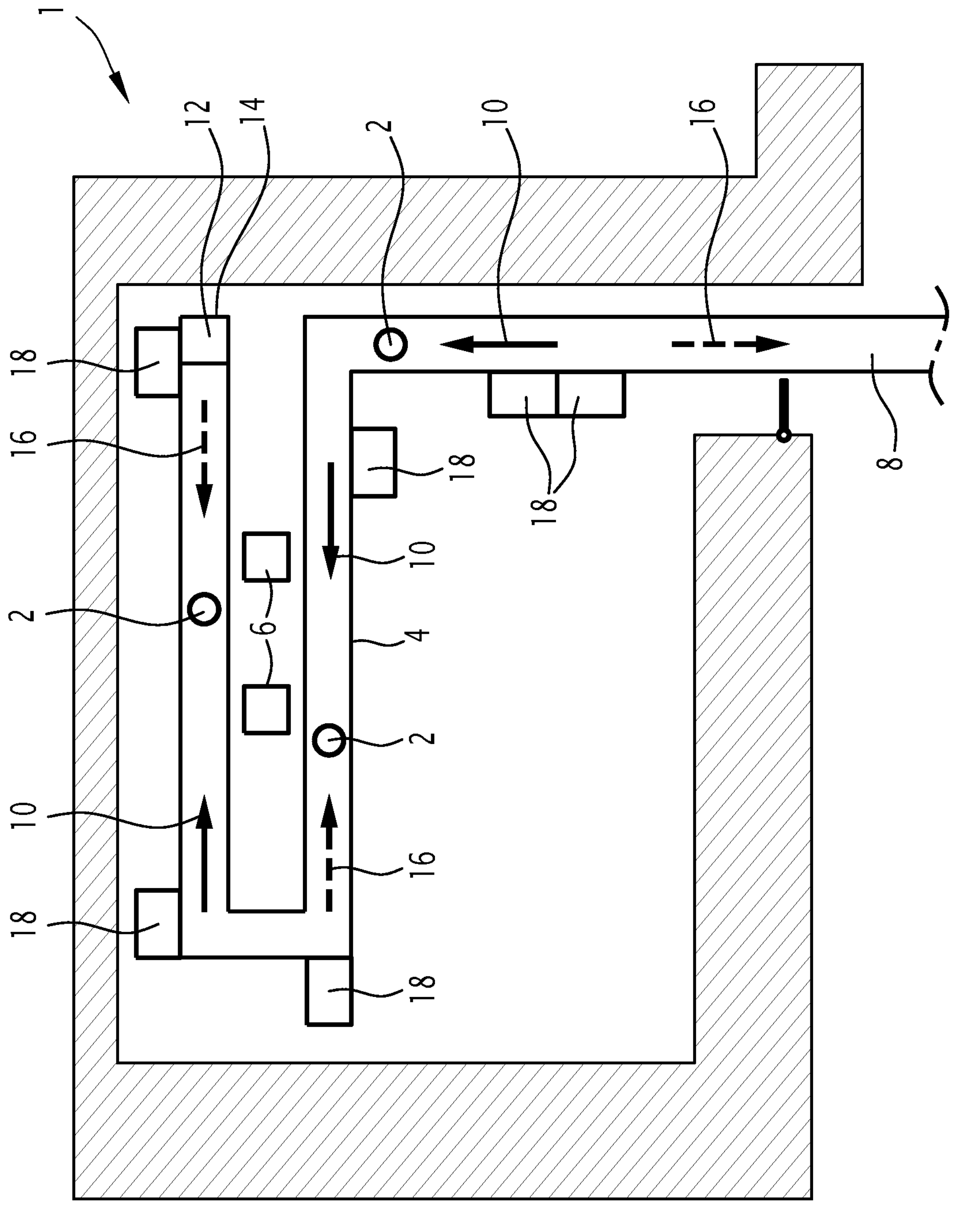
FIG. 1 is a top view of a sterilization facility that has several detection devices according to the present disclosure in keeping with an execution example.

FIG. 1 shows a facility for sterilization 1 of objects 2 through exposure to radiation. The facility for sterilization 1 includes a conveyor system 4 to transport the objects 2 along the conveyor line. The facility for sterilization 1 has one or more radiation sources 6 that are arranged to sterilize the objects 2. Each radiation source 6 is specifically arranged to expose one or more objects 2 to radioactive radiation in order to achieve sterilization of the object 2.

The conveyor system 4 comprises more than one level, such as two levels. For example, the conveyor system 4 is configured to transport each object 2 from an entrance 8 along a conveyor line to a first level, as symbolized specifically by the arrows 10. At a reversal area 12, the conveyor line comprises the conveyor system 4, such as an elevator 14 that transports each object 2 from the first level to a second level. The second level is located above or below the first level, for example.

According to one execution example, the conveyor system 4 is configured to transport each object 2 from the reversal area 12 along a conveyor line onto the second level, as specifically symbolized by the arrows 16.

For example, each object 2 is a sterilization unit that comprises a medical object.

The facility for sterilization 1 further comprises one or more detection devices 18.

The detection device 18 is configured to detect the position of one or more moving objects 2.

In particular, the detection device 18 is configured to detect the position of the moving object 2, while moving object 2 is being transported by at least one conveyor system 4 along the conveyor line.

Figure 2:
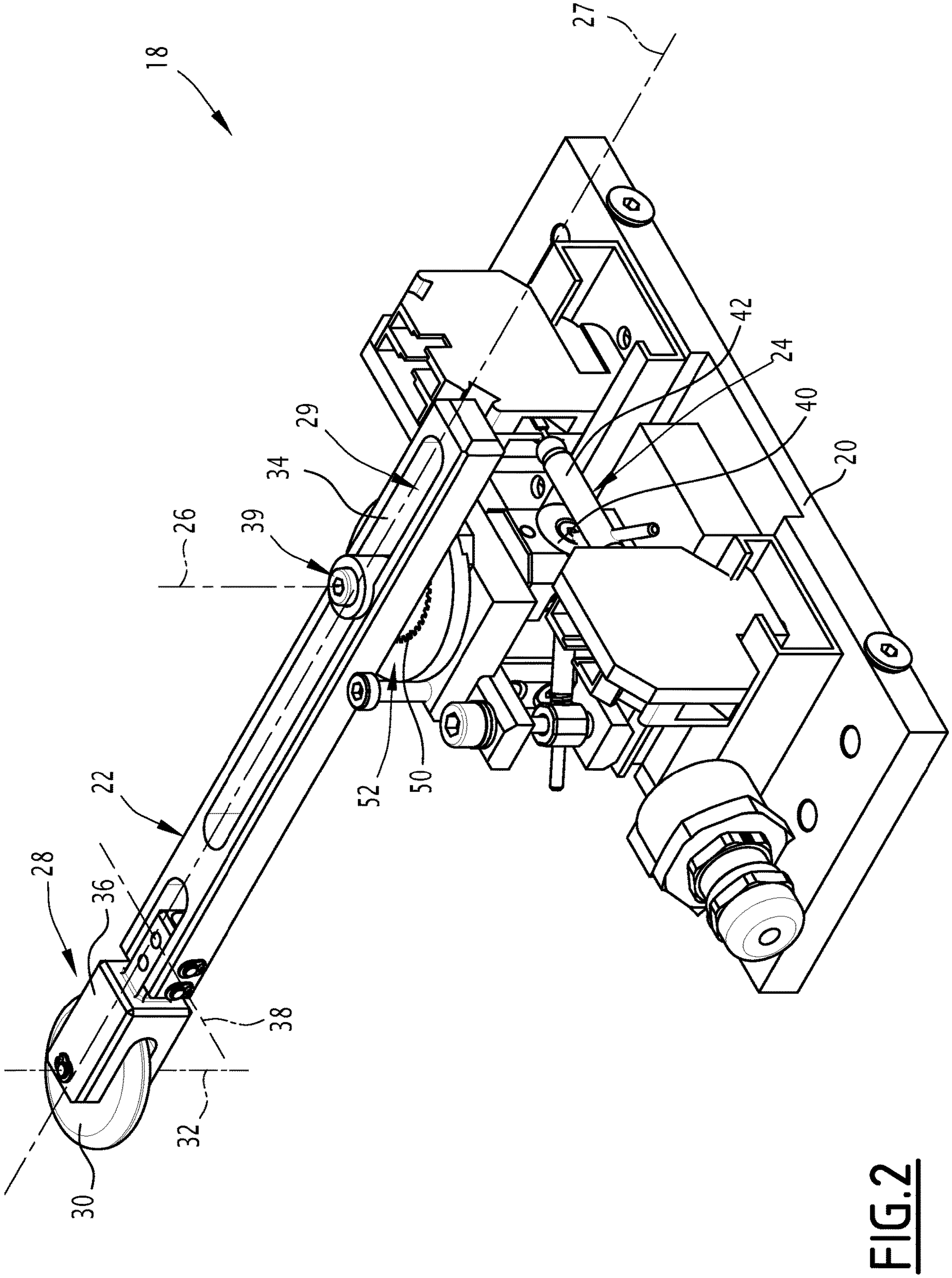
FIG. 2 is a perspective view of the detection device according to the present disclosure in keeping with an execution example.
Figure 3:
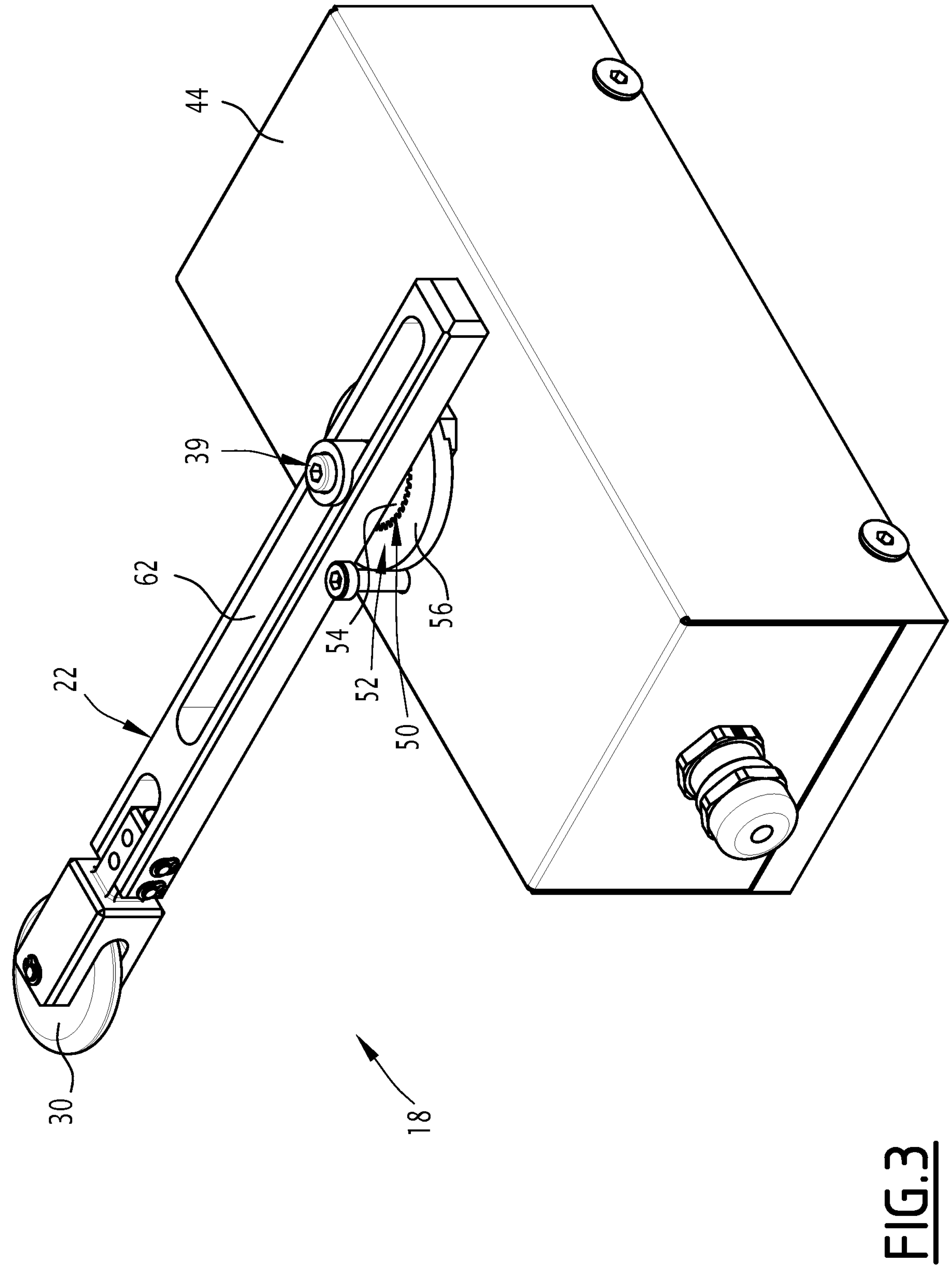
FIG. 3 is a perspective view of the detection device according to the present disclosure in FIG. 2 with a housing.

FIGS. 2 and 3 show an execution example of the detection device 18. The detection device 18 comprises a base 20, an arm 22, and a sensor 24.

In one execution example, the base 20 comprises a metal plate that is configured to carry the arm 22 and the sensor 24.

Figure 4:
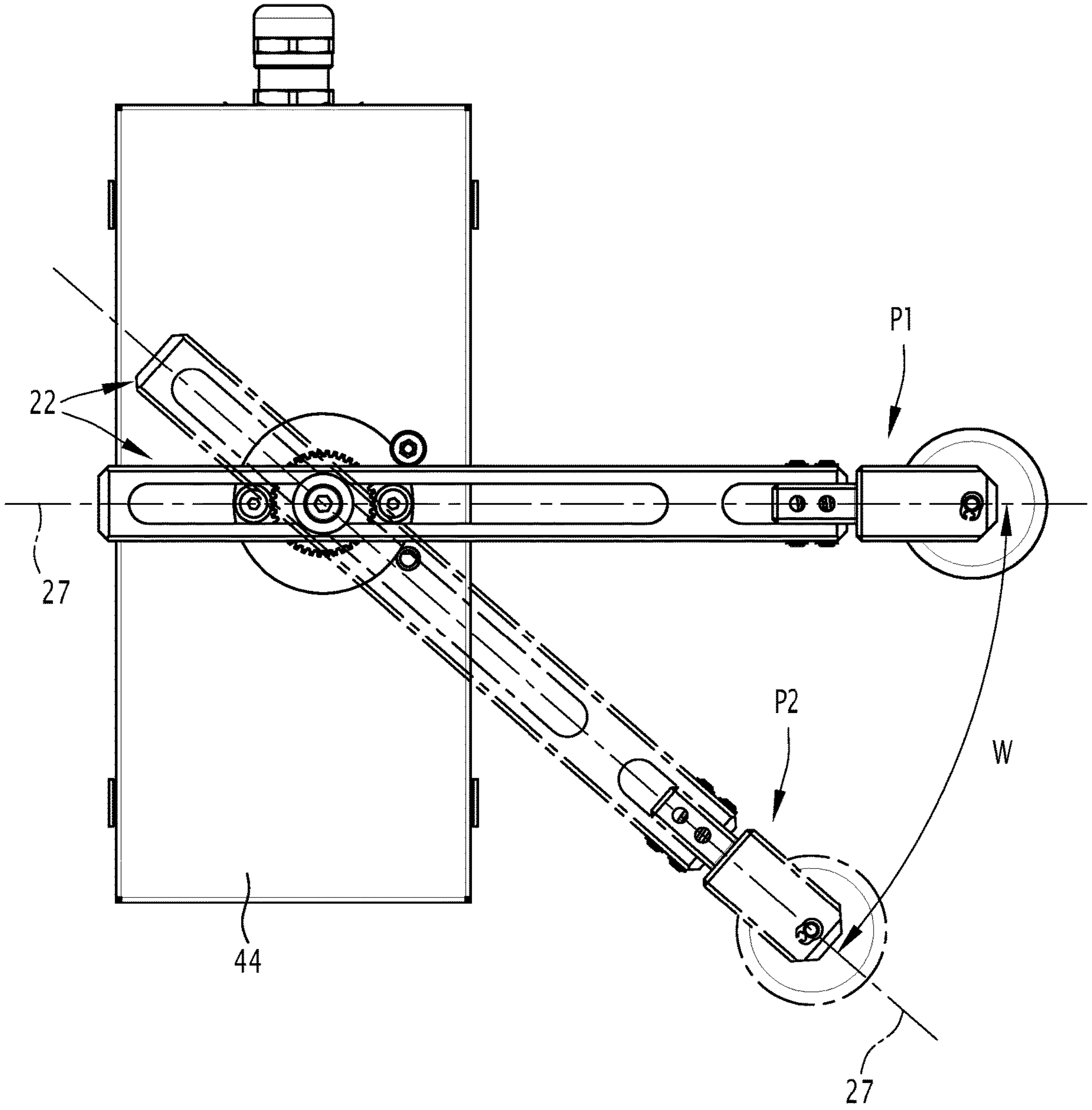
FIG. 4 is a top view of the detection device according to the present disclosure in FIG. 2.

The arm 22 is mounted rotatable to the base 20. The arm 22 is rotatable around a first rotational axis 26, in particular between a first rotational position P1 of the arm 22 and a second rotational position P2, as shown in the example in FIG. 4. The first rotational axis 26 is specifically orthogonal to a level that comprises the metal plate of the base 20.

In the execution example in FIGS. 2 and 3, the arm 22 is in the first rotational position P1.

The arm 22 has a longitudinal axis 27. The longitudinal axis 27 of the arm 22 in the first rotational position P1 has an angle W between 10% and 90% compared to the second rotational position P2.

According to execution examples, the shaft 39 has an adjustment device 52. Using the adjustment device 52, the arm 22 is adjustable in relation to the shaft 39, in particular the adjustment device of the arm 22 at one level vertical to the first rotational axis 26. The adjustment device 52 is configured to rotate with the shaft 39. In one embodiment, the adjustment device 52 is arranged in such a way that the arm 22 is adjustable to the shaft 39 in equal steps, such as through a raster 50. For example, the steps may have an angle of between 2 and 20 degrees, and in particular between 5 and 15 degrees. In the example shown in FIG. 3, the steps have an angle of 9 degrees. The raster 50 is provided by a tooth system. For example, the arm 22 is fastened to an inner gear 54 with external teeth. An external ring 56 with internal teeth is non-rotatably connected to the shaft 39. The external teeth of the internal gear 54 and the internal teeth mesh together. Using the number of external teeth and internal teeth, the desired raster or step angle can be selected.

As described further below, the internal gear 54 can be formed by a shaft profile 60 of the shaft 39 or by other means that clearly establish the position of the arm 22 relative to the internal gear 54 or allows the arm 22 to be attached only in a specific direction of rotation on the gear 54. To set the (rotational) position of the arm 22, the internal gear 54 is inserted in an appropriate position into the outer ring 56 and then the arm 22 is placed on the internal gear 54 according to the specified (rotational) position.

According to execution examples, the shaft profile 60 with the internal gear 54 and external ring 56 are arranged such that when the arm 22 rotates around the first rotational axis 26, they also rotate around the first rotational axis 26.

Still other adjustment devices 52 are conceivable, such as one or more grooves or protrusions that work together with the arm 22.

Triggering of a switch 42 (described below) is specially adjustable.

According to variants, the adjustment device 52 is configured to allow setting between 10° and 90°. This means, for example, that triggering/actuation of the switch 42 can be set between 10° and 90° without a raster.

For example, the arm 22 has a longitudinal opening 29 for installing the arm 22 to the base 20. The arm 22 is specifically adjustable against the base 20 in the direction of the longitudinal axis 27. For example, the arm 22 is configured to be slid in the direction of the longitudinal axis 27, depending on the size of the object 2 and/or the course of the conveyor line of object 2.

The arm 22 has a free end 28 for contact with the moving object 2. For example, at the free end 28 the arm 22 has a roller 30 that is configured to form a contact point for the moving object 2. The roller 30 has a rotational axis 32 against the arm 22. The rotational axis 32 of the roller 30, for example, is parallel to the first rotational axis 26, as can be seen in the execution example in FIGS. 2 and 3.

In one execution example, the direction of the rotational axis 32 of the roller 30 in a level containing the longitudinal axis 27 of the arm 22 and the first rotational axis 26 can be varied.

For example, the detection device 18 is configured to detect the position of the moving object 2 when it moves in a horizontal direction, and in particular in a horizontal direction orthogonal to the longitudinal axis 27 in the first rotational position P1 of the arm 22. By this movement of the detection device 18, the arm 22 is arranged, for example, to be deflected between the first and second rotational position P1, P2.

According to one execution example, the arm 22 has a first section 34 and a second section 36.

For example, the first section 34 is mounted rotatable to the base 20. The second section 36 extends the first section 34, for example. In particular, the second section 36 extends from the first section 34 in the direction of the free end 28. In particular, the second section 36 is mounted rotatable to the first section 34 around a second rotational axis 38. The second longitudinal axis 38 is specifically orthogonal to the first rotational axis 26, in particular the rotational axis 32 of the roller 30 at the level that contains the longitudinal axis 27 of the arm 22 and the first rotational axis 26.

When the second section 36 rotates around the second rotational axis 38, the roller 30 also rotates in the direction of the rotational axis 32 of the roller 30.

For example, the roller 30 is configured to come into contact with the moving object 2. The arm 22 is in particular configured to be deflected upon contact with the moving object 2 and to be rotated around the first and/or second rotational axis 26, 38.

For example, the arm 22 is arranged for multi-axis movement, in particular by means of the second section 36, which is rotatable in relation to the first section 34.

Upon contact with the moving object 2, wherein the moving object 2 is moving in a direction that includes a vertical component, the arm 22 is for example configured to be deflected according to the movement of the object 2. "Vertical component" is understood to mean a component of a direction parallel to the first rotational axis 26.

According to execution examples, the arm 22 is mounted to the base 20 by at least one form-fitting component.

For example, the arm 22, and in particular the first section 34 of the arm 22, is mounted by a shaft 39 rotatable to the base 20. The shaft 39 is specifically form fit to the arm 22. For example, the shaft 39 is form fit in the longitudinal axis 27 of the arm 22. In particular, the shaft 39 is connected form-fitting to the arm 22, such that the arm 22 is slidable only toward the longitudinal axis 27.

Figure 5:
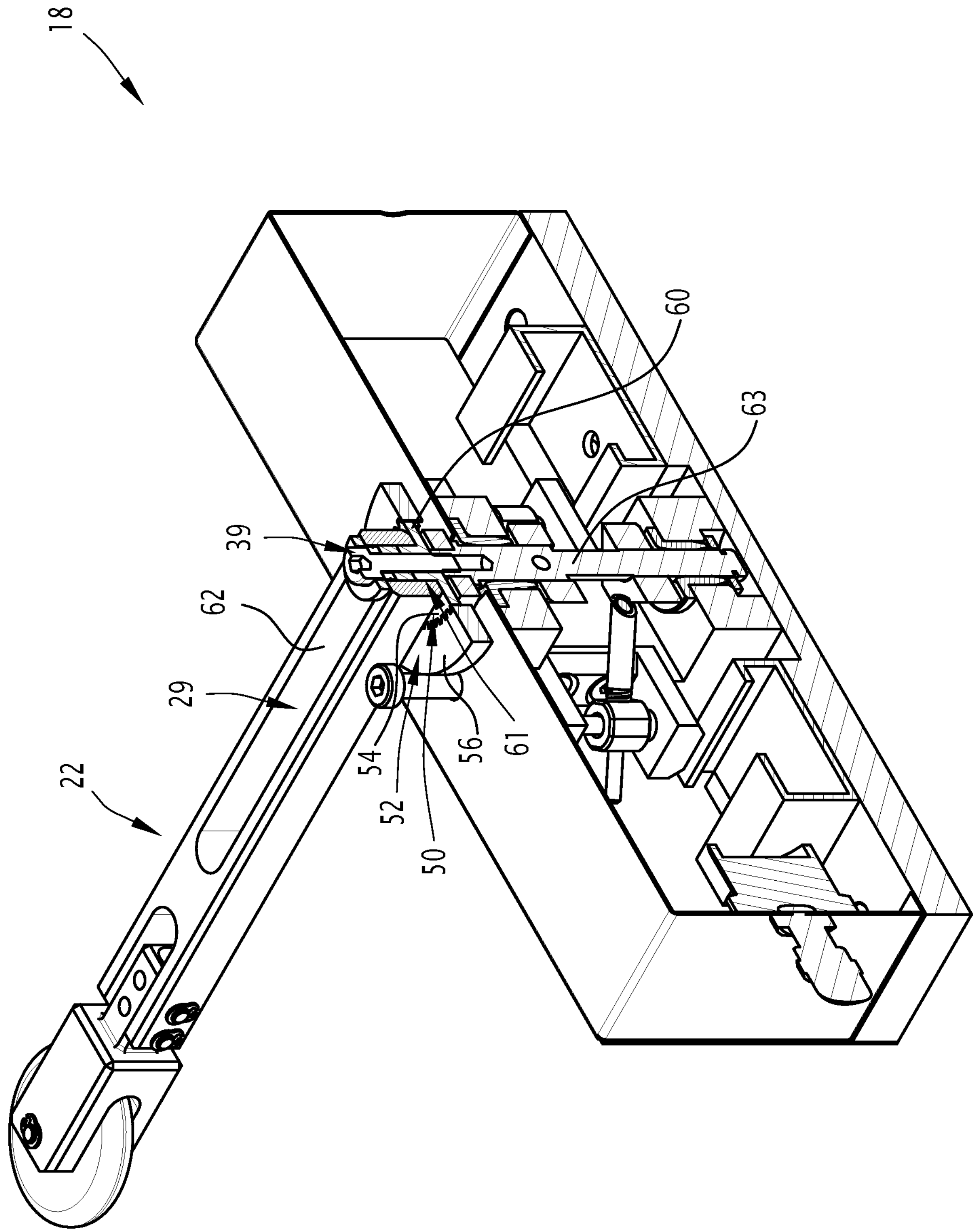
FIG. 5 is a perspective view of the detection device in FIG. 2 with a horizontal cross-section of the detection device.

According to one embodiment, the shaft 39 has a shaft profile 60 that includes the internal gear 54, for example. The shaft profile 60 is suitable for creating a form-fitting connection between the arm 22 and the shaft 39, as shown in the example in FIG. 5.

The shaft profile 60 has, in particular, a complementary surface 61 to at least one surface 62, in particular two preferentially parallel surfaces 62 of the arm 22. For example, the longitudinal opening 29 has at least one surface 62 on its interior. The complementary surface 61 specifically forms what is called a key face for the arm 22. In another embodiment, the arm 22 can provide surfaces 62 on its outer side that interact with a corresponding section of the shaft 39.

According to one embodiment, the shaft profile 60 forms an attachment of the shaft 39, that is connected form-fitting to a bolt 63 of shaft 39.

The form-fitting connection between arm 22 and shaft 39 allows connection without play, so that the detection device 18 operates precisely.

A form-fitting connection between the arm 22 and the shaft 39 in particular allows a requirement to be met regarding standard EN ISO 13849 the safety requirements of safety-related parts of controls. This means that the detection device 18 is suitable for use as a safety-relevant device.

Furthermore, the detection device 18 has, for example, at least one bearing (not shown in the figures), in particular two bearings, for mounting the shaft 39 on the base.

For example, each bearing is a sliding bearing that specifically has a sliding bearing bushing. For example, each bearing is a dry plain bearing without lubrication.

The sensor 24 of the detection device 18 is configured to detect rotation of the arm 22 relative to the base 20, and thereby in particular detect the position of the moving object 2.

The sensor 24 has a first part and a second part. The first part is arranged so that it moves with the arm 22, and the second part is attached to the base 20. For example, the first part is attached to the shaft 39.

The first part is a first component of a magnet (40) switch (42) pair and the second part is the other component of the magnet (40) switch (42) pair.

According to one execution example, the first part is a magnet 40 and the second part is an electrical switch 42. According to an alternative execution example, the first part is the electrical switch 42 and the second part is the magnet 40.

The magnet 40 is specifically a permanent magnet. According to execution examples, the magnet 40 is of any magnet type that is a passive component without a provided energy supply and that is configured to create a magnetic field.

The electrical switch 42 is configured to be actuated by the magnetic field of the magnet 40. The electrical switch 42 is in an initial state when the arm 22 is in the first rotational position P1, and in a second state when the arm 22 is in the second rotational position P2.

In particular, the axis 39 is in an initial predefined position when the arm 22 is in the first rotational position P1, and in a second predefined position when the arm 22 is in the second rotational position P2. The position of the axis 39 is in particular independent of angle fixation of the arm 22 relative the shaft 39 by means of the adjustment device 52. In the first predefined position, the electrical switch 42 is in the first state, and in the second predefined position, the electrical switch 42 is in the second state.

The first state, for example, is an "OFF" state of the electrical switch 42, wherein the electrical switch 42 does not detect the moving object 2. The second state, for example, is an "ON" state of the electrical switch 42, wherein the electrical switch 42 detects the moving object 2.

For example, when the arm 22 is rotated around the W angle, the electrical switch 42 triggers.

According to execution examples, the electrical switch comprises a glass tube and metal contact tongue fused into the glass tube, such as one made of an iron-nickel alloy. The contact tongue is configured to be actuated by the magnetic field. The electrical switch 42 comprises a reed switch, for example.

For example, the electrical switch 42 is configured to be connected to a control device by ceramic terminals and/or glass fibreglass cables. For example, this allows the detection device's temperature and radiation resistance to be further increased.

According to execution examples, at least the arm 22, the shaft 39 or the bearing partially consists of metal. According to one execution example, both the arm 22 and the shaft 39 and the bearing are made at least partially, preferentially completely, of metal. This particularly increases the detection device's resistance to radioactive radiation, because metal, in comparison to polymers, for example, is not degraded by radioactive radiation.

According to execution examples, the detection device 18 further has at least one reset device, in particular a spring (not shown), that is configured to move the arm 22 from the second rotational position P2 back to the first rotational position P1.

According to execution examples, the detection device 18 further has a housing 44, which is specifically mounted to a base 20, such as that shown in FIG. 3.

The housing 44 is arranged specifically to cover the magnet 40 and the electrical switch 42. The first and second parts of the sensor 24 are therefore specifically located in the housing 44.

For example, the arm 22 extends in a direction orthogonal to the first rotational axis 26 through extension of the housing 44 in this direction.

For example, the detection device 18 is configured to resist a gamma dose up to 20 kGy/h.

To "withstand a gamma dose of 20 kGy/h" is understood to mean that the detection device 18 can detect the position of the moving object 2 up to a dose that high.

For example, the detection device 18 is configured to resist a temperature of up to 200° C.

To "permanently withstand a temperature of 200° C." is understood to mean that beyond such a temperature load the detection device 18 can detect the position of the moving object 2, in particular after such a temperature load over a period of a year.

The present disclosure has a number of advantages.

Movement of the moving object 2 along the detection device 18 causes rotation of the arm 22 and thereby allows detection of the position of the moving object 2.

The detection device 18 has high radiation resistance and/or high resistance to high temperatures, in particular because of the sensor 24, which comprises the magnet 40 and the electrical switch 42, wherein the electrical switch 42 is configured to be actuated by the magnetic field of the magnet 40.

When a detection device 18 is used, the detection device 18 detects a position of the moving and/or transported object 2 in a facility for sterilization 1.

What is claimed is:

1. A detection device for detecting a position of a moving object, wherein the detection device comprises:

a base;

an arm that is mounted rotatable to the base, wherein the arm is rotatable around a first rotational axis and has a free end for contact with the moving object; and a sensor that is configured to detect rotation of the arm relative to the base, wherein the sensor has a first part and a second part, wherein the first part moves with the arm, and the second part is attached to the base;

the first part being a first component of a magnet switch pair, the switch being an electrical switch that is configured to be actuated by the magnetic field of the magnet, the second part being a second component of the magnet switch pair, the electrical switch being in an initial state when the arm is in a first rotational position, and wherein the electrical switch is in a second state when the arm is in a second rotational position that is different from the first rotational position, and that the detection device comprising a reset device that is a spring, which is configured to move the arm from the second rotational position into the first rotational position, the arm comprising a first section on the free end of the arm that is mounted rotatable to the base, and a second section that extends from the first section, the second section being mounted rotatable to the first section, the second section being rotatable around a second rotational axis that is orthogonal to the first rotational axis.

2. The detection device according to claim 1, wherein the arm is mounted rotatable to the base by a shaft and two bearings.

3. The detection device according to claim 1, wherein the detection device is configured to resist a gamma dose of 20 kGy/h.

4. The detection device according to claim 1, wherein the arm is mounted to the base by at least one form-fitting component.

5. The detection device according to claim 1, wherein the magnet comprises a permanent magnet.

6. The detection device according to claim 1, wherein the magnet is a permanent magnet.

7. The detection device according to claim 1, wherein the first and second parts of the sensor are located in a housing that is mounted on the base.

8. A method for detecting comprising:

providing the detection device according to claim 1;

detecting, using the detection device, a position of an object transported in a facility for sterilization.

9. A facility for sterilization of a moving object by irradiation comprising:

conveyor system for transport of the at least one moving object; and the detection device according to claim 1, the detection device being configured to detect a position of the transported moving object.

10. The detection device according to claim 1, wherein the arm is mounted rotatable to the base by a shaft and at least one bearing.

11. The detection device according to claim 10, wherein the at least one bearing is a sliding bearing.

12. The detection device according to claim 10, wherein the arm, the shaft and the at least one bearing consist of metal.

13. The detection device according to claim 10, wherein the first part of the sensor is attached to the shaft.

14. The detection device according to claim 1, wherein the arm has a roller on the free end, wherein the roller is configured to form a contact point for the moving object.

15. The detection device according to claim 14, wherein a rotational axis of the roller is parallel to the first rotational axis.

16. The detection device according to claim 1, wherein the electrical switch comprises a reed switch.

17. The detection device according to claim 16, wherein the electrical switch is a reed switch.

* * * * *